March 4, 1924.
W. F. McKAY
VALVE
Filed April 11, 1923
1,485,792
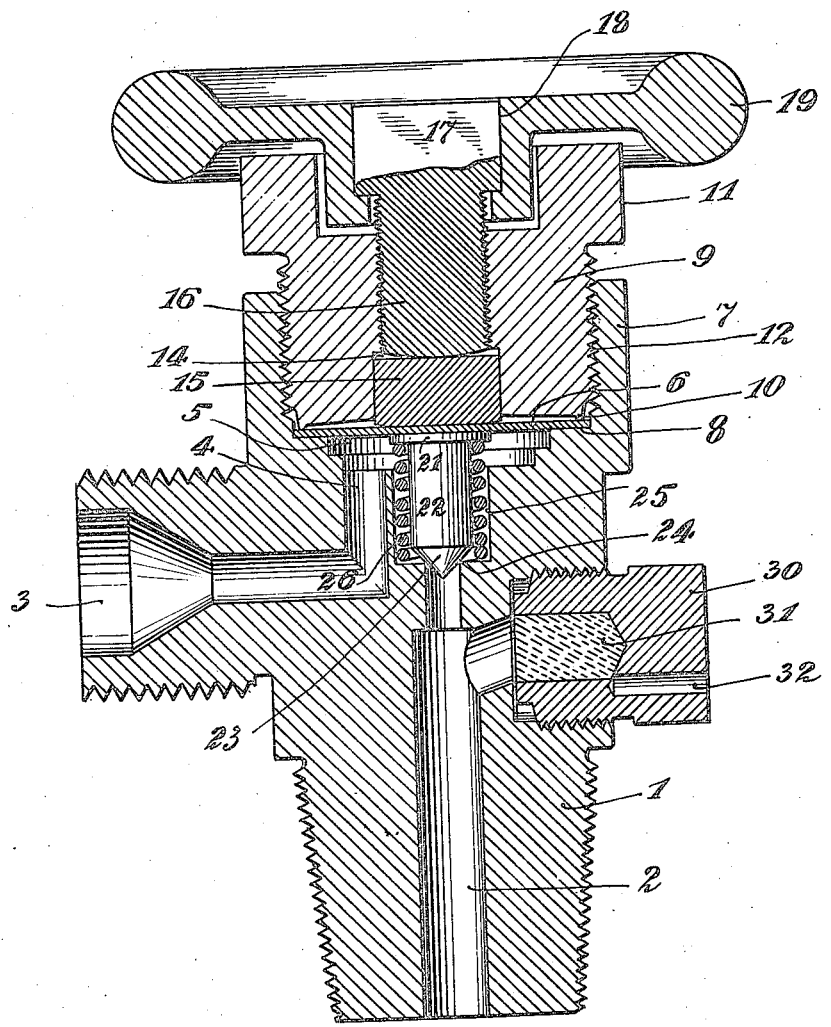
INVENTOR
William F. McKay
BY
his ATTORNEY Patented Mar. 4, 1924.

1,485,792

UNITED STATES PATENT OFFICE.

WILLIAM F. McKAY, OF NEWARK, NEW JERSEY, ASSIGNOR TO INTERNATIONAL OXYGEN COMPANY, OF NEWARK, NEW JERSEY.

VALVE.

Application filed April 11, 1923. Serial No. 631,255.

*To all whom it may concern:*

Be it known that I, WILLIAM F. McKAY, a citizen of Great Britain, and resident of Newark, in the county of Essex and State of New Jersey, have invented certain new and useful Improvements in Valves, of which the following is a specification.

My present invention is shown as embodied in a valve primarily designed for charging and discharging oxygen, hydrogen, and other high pressure gas tanks, but it will be obvious that various of its features are applicable for controlling the flow of other fluids. The high pressure gas tank valves of the type to which my present invention applies are characterized by gas-tight diaphragms clamped to an annular seat by massive screw plug, the valve operating means being outside, in operative relation to the outer face of the diaphragm while the valve element is inside the valve chamber in operative relation to the inner face of the diaphragm.

In such constructions it has been common to have a cone element of the valve engaging the passage controlled thereby and a base element engaged by the sealed-in face of the diaphragm. For high pressure gases, such diaphragms should be small and must be thin to permit of the required amplitude of opening and closing movements which are to be transmitted therethrough from the exterior operating means to the interior valve element. In practice it is found very undesirable to attempt to rivet, braze or otherwise secure the cone valve to the inner face of the diaphragm because of the weakening effect on the diaphragm.

My present invention concerns improvements whereby it is possible to use for the diaphragm a single plane sheet of metal, preferably hard rolled brass or bronze, yet have the cone valve accurately centered with reference to the diaphragm to the valve seat and have the range of movement of the valve so small that no undue strains will be applied to the diaphragm in flexing to the extent required to open and close the valve.

These objects are accomplished by two simple improvements. The first is to have the valve stem in the form of a cylinder about which fits a cylindrical (helical) spring which, in turn, practically fits a cylindrical recess, only enough clearance being allowed to permit inflow and out-flow of the gas along the spring and to permit such slight changes of the diameter of the spring as occur when the latter is compressed. By making this spring powerful so that the diaphragm is thereby thrust outward positively and with considerable force, the range of flexure of the diaphragm back of normal becomes more nearly equal to the permissible range of forward flexure. Furthermore, by thus accurately centering the valve by means of the helical spring and its guiding recess, I am able to make the angle of the "needle" or cone tip of the valve much greater than the 60° angle which has heretofore been the practice, preferably about 90°. As will be obvious the more blunt this angle is made the less will be its own self-centering effectiveness but the wider will be the annulus for inlet or outlet of gas, for a given range of adjusting movement of said valve.

The above and other features of my invention may be more fully understood from the following description in connection with the accompanying drawing, in which the figure is a characteristic longitudinal axial section of the valve plug with the operative parts in place therein.

In this drawing the valve plug comprises a screw threaded portion 1 adapted to serve as a closure for a compressed gas tank. The body is formed with an axial passage 2 communicating with the gas tank at its lower end and at its upper end communicating with the exterior outlet 3, 4, through the valve chamber 5. This cavity 5 is closed at the top by the diaphragm 6, which may be a plane sheet of bronze which is shown as resting directly on a ledge 8, although a washer may be interposed if desired. Then the diaphragm is clamped against this ledge by means of a screw plug 9, having a rounded clamping annulus 10 which may be screwed down as tightly as may be desired but having the exterior at 11 formed with a nut, or having other suitable formation for application of a spanner or similar tool. The exterior of this clamping plug has a screw thread 12 engaging the screw threaded barrel 7.

The interior of the plug is formed as shown with a cylindrical recess 14, in which slides a thrust block 15 which rests upon the diaphragm and which is adapted to be forced against the same by means of screw 16 which has a squared head 17 engaged in a squared recess 18 in the hand wheel member 19. By rotating the latter the diaphragm 6 may be depressed or released to force closure or permit opening the valve member.

The valve member comprises a flat flange-like head 21, a relatively large diameter cylindrical shank 22, and a cone or needle 23 which is adapted to engage a seat 24 at the upper end of vertical passage 2. The shank 22 is relatively long so as to reach through a cylindrical recess 25. In the interspace between the wall of recess 25 and the cylindrical shank 22 is arranged a heavy, powerful spiral spring 26, the interior of which approximately fits said stem 22 and the exterior of which approximately fits said recess 25 with only the above-described clearance necessary for easy working and inlet and outlet of gas. It will be noted that the guiding recess 25 is much deeper vertically than the chamber 5, so that the helical spring 26 is very well guided throughout its length except for a turn or two of its length which extends vertically through the chamber 5. Consequently the upper end of the valve is very well guided and accurately centered with respect to the diaphragm 6 and with respect to the valve seat 24. The method of assembly and operation of the above will be obvious from the foregoing. The valve and spring are assembled within recess 25; diaphragm 6 is applied; block 15 is inserted in recess 14 and the clamping plug 9 screwed down upon the diaphragm as tightly as may be desired. Then the valve operating screw 16 is inserted with its head 17 engaging recess 18, as shown. Then rotating the hand wheel 19 operates to seat the valve as powerfully as required while reverse rotation will unscrew 16 and release the valve, whereupon the powerful spring 26 will thrust the valve and the diaphragm upward flexing it above normal, as permitted by release of the clamping pressure through 15.

It will be noted that in this operation the broad head 21 of the valve member engaging the diaphragm 6 operates to parallel the axis of the valve with the axis of the valve seat while the slight lateral play of guiding spring 26 will permit such very slight lateral shift of the valve as may be necessary to bring the axes into exact coincidence and the valve into perfect fit upon its seat.

30 is a relief plug of well-known type containing relatively soft metal 31, adapted to blow throughout lead 32, in case of too great abnormal pressures, as for instance, in case of fire or other condition operating to overheat the tank.

I claim:
1. A valve having a valve chamber formed with inlet and outlet openings, and one wall of said chamber being an imperforate diaphragm opposite and co-axial with one of said openings; a valve element including a cone portion engaging in the latter opening, and having a broad base portion abutting against but unattached to the diaphragm; and means for centering and retracting said valve element including a helical spring, the interior of which approximately fits the exterior of the valve stem and the exterior of which approximately fits a cylindrical recess between the valve seat and the valve chamber, in combination with means for operating the valve element including external means for forcing the diaphragm inward against the pressure of said spring.

2. A valve having a valve chamber formed with inlet and outlet openings, and one wall of said chamber being an imperforate diaphragm opposite and co-axial with one of said openings; a valve element including a cone portion engaging in the latter opening, having a cone angle of approximately 90 degrees, and having a broad base portion abutting against but unattached to the diaphragm; and means for centering and retracting said valve element including a powerful, helical spring, the interior of which approximately fits the exterior of the valve stem and the exterior of which approximately fits a cylindrical recess between the valve seat and the valve chamber, in combination with means for operating the valve element including external means for forcing the diaphragm inward against the pressure of said spring.

3. A valve having a valve chamber formed with inlet and outlet openings, and one wall of said chamber being an imperforate diaphragm opposite and co-axial with one of said openings; a valve element including a cone portion engaging in the latter opening, having a cone angle substantially greater than 60 degrees, and having a broad base portion abutting against but unattached to the diaphragm; and means for centering and retracting said valve element including a powerful, helical spring, the interior of which approximately fits the exterior of the valve stem and the exterior of which approximately fits a cylindrical recess between the valve seat and the valve chamber, in combination with means for operating the valve element including external means for forcing the diaphragm inward against the pressure of said spring.

Signed at New York in the county of New York and State of New York this 10th day of April, A. D. 1923.

WILLIAM F. McKAY.